(12) United States Patent
Chen et al.

(10) Patent No.: US 11,668,474 B2
(45) Date of Patent: Jun. 6, 2023

(54) HEAT RECOVERY DEVICE AND AIR CONDITIONING SYSTEM

(71) Applicant: AIRSYS Refrigeration Engineering Technology (Beijing) Co. Ltd., Beijing (CN)

(72) Inventors: Yunshui Chen, Beijing (CN); Xuming Fang, Beijing (CN); Kai Han, Beijing (CN); Yaguo Ma, Beijing (CN)

(73) Assignee: AIRSYS Refrigeration Engineering Technology (Beijing) Co. Ltd., Beijing (CN)

( * ) Notice: Subject to any disclaimer, the term of this patent is extended or adjusted under 35 U.S.C. 154(b) by 255 days.

(21) Appl. No.: 17/037,723

(22) Filed: Sep. 30, 2020

(65) Prior Publication Data

US 2021/0199313 A1    Jul. 1, 2021

(30) Foreign Application Priority Data

Dec. 31, 2019   (CN) .......................... 201911425690.4

(51) Int. Cl.
*F24F 1/032*    (2019.01)
*F24F 12/00*   (2006.01)
*F24F 13/20*   (2006.01)
*F24F 13/14*   (2006.01)
*F24F 13/30*   (2006.01)

(52) U.S. Cl.
CPC ............ *F24F 1/032* (2019.02); *F24F 12/006* (2013.01); *F24F 13/14* (2013.01); *F24F 13/20* (2013.01); *F24F 13/30* (2013.01)

(58) Field of Classification Search
CPC .......... F24F 1/022; F24F 1/028; F24F 1/0314; F24F 1/032; F24F 12/006; F24F 13/20
See application file for complete search history.

(56) References Cited

U.S. PATENT DOCUMENTS 5,485,878 A  *  1/1996  Derks .................... F24F 3/044
                                                       165/250
2014/0106660 A1*  4/2014  Salerno ................ F24F 12/006
                                                       454/239

(Continued)

FOREIGN PATENT DOCUMENTS

CN         2531303 Y     1/2003
CN        101109550 A    1/2008
CN        104864541 A    8/2015

(Continued)

OTHER PUBLICATIONS

Machine Translation of CN2531303 (Year: 2003).*

*Primary Examiner* — Joseph F Trpisovsky
(74) *Attorney, Agent, or Firm* — Gang Yu (57) ABSTRACT

Some embodiments of the present disclosure provide a heat recovery device and an air conditioning system. The heat recovery device includes: a shell, provided with an indoor air return port, a first outdoor air inlet and an air outlet; a fresh air heat recovery assembly, disposed in the shell, the fresh air heat recovery assembly including a first heat exchange passage and a second heat exchange passage exchanging heat with each other; and an air valve assembly, disposed in the shell, and located between the fresh air heat recovery assembly and the indoor air return port, the air valve assembly having a first position and a second position.

8 Claims, 6 Drawing Sheets

(56) References Cited

U.S. PATENT DOCUMENTS

2016/0370029 A1    12/2016  Kurelowech
2019/0086113 A1*  3/2019  Horie ...................... F24F 11/52

FOREIGN PATENT DOCUMENTS

| CN | 107806698 | A |   | 3/2018  |           |
|----|-----------|---|---|---------|-----------|
| CN | 208075230 | U |   | 11/2018 |           |
| EP | 3663657   | A1 | * | 6/2020 | F24F 1/022 |
| GB | 2528642   | A | * | 2/2016  | F24F 1/02 |

* cited by examiner

HEAT RECOVERY DEVICE AND AIR CONDITIONING SYSTEM

CROSS-REFERENCE TO RELATED APPLICATION(S)

The present disclosure claims priority to Chinese Patent Application No. 201911425690.4, filed on Dec. 31, 2019 and entitled "Heat Recovery Device and Air Conditioning System", the contents of which are hereby incorporated by reference in its entirety.

TECHNICAL FIELD

The present disclosure relates to a field of air conditioning cooling and heating, and more particularly, to a heat recovery device and an air conditioning system.

BACKGROUND

Air conditioners have been widely used in daily life and work, providing people with a comfortable temperature and humidity environment. Due to the limitation of size and internal structure, household air-conditioning products can only treat indoor air temperature and humidity, and cannot introduce fresh air into a room. When using household air-conditioning products, if it is necessary to introduce fresh air into the room, an additional fresh air system needs to be added, which increases energy consumption. Especially in summer or winter, when the temperature difference between indoor and outdoor is large, the energy consumption is higher, and it is difficult to meet the energy-saving requirements of air conditioning equipment. In order to meet the energy-saving requirements of the air conditioning equipment, a fresh air system with a heat recovery function is installed; however, the fresh air system has a complicated structure, and there are problems of complicated installation and high installation cost. The fresh air system may be arranged in a central air-conditioning system. However, when the installed fresh air system is a fresh air system with a heat recovery function, due to its large size and limited space, it cannot be installed in some cases. Even if the fresh air system can be installed normally, the installation requires professional and technical personnel, the operation is complicated, and the installation cost is high.

That is to say, there is a need to develop an air conditioning system with the functions of fresh air and heat recovery, convenient installation and low installation cost.

SUMMARY

Some embodiments of the present disclosure provide a heat recovery device and an air conditioning system. The air conditioning system equipped with the heat recovery device has the functions of fresh air and heat recovery, is convenient to install, and has low installation cost.

According to an aspect of some embodiments of the present disclosure, a heat recovery device is provided. The heat recovery device includes: a shell, provided with an indoor air return port, a first outdoor air inlet and an air outlet; a fresh air heat recovery assembly, arranged in the shell, the fresh air heat recovery assembly includes a first heat exchange passage and a second heat exchange passage exchanging heat with each other; and an air valve assembly, disposed in the shell, and located between the fresh air heat recovery assembly and the indoor air return port, wherein the air valve assembly has a first position and a second position; when the air valve assembly is at the first position, the indoor air return port is communicated with the air outlet through the first heat exchange passage, the indoor air return port is communicated with a first air supply port of the air valve assembly, and a first outdoor air inlet is communicated with a second air supply port of the fresh air heat recovery assembly through the second heat exchange passage; and when the air valve assembly is at the second position, the air valve assembly is blocked between the first outdoor air inlet and the second air supply port of the fresh air heat recovery assembly, and the indoor air return port is communicated with the first air supply port.

In some embodiments, the fresh air heat recovery assembly further includes: a first case; a fresh air fan, disposed in the first case, the fresh air fan being arranged correspondingly to the first outdoor air inlet, and the fresh air fan being configured to transport fresh air from outside into the second heat exchange passage; and a heat exchanger, disposed in the first case, the first heat exchange passage and the second heat exchange passage being disposed inside the heat exchanger.

In some embodiments, the fresh air heat recovery assembly further includes a fan governor for adjusting a rotation speed of the fresh air fan, and the fan governor is disposed in the first case.

In some embodiments, the first case includes a top plate and a bottom plate disposed oppositely, and a first side plate and a second side plate for connecting the top plate and the bottom plate, the first side plate and the second side plate being arranged oppositely.

In some embodiments, the fresh air heat recovery assembly further includes an installation plate disposed in the first case, the installation plate is provided with a first installation hole for installing the fresh air fan, and the installation plate is connected with the bottom plate; or, the installation plate is connected with both the bottom plate and the top plate.

In some embodiments, the first side plate or the second side plate is provided with a second installation hole, the fresh air heat recovery assembly further includes an installation housing located in the first case, the installation housing is provided with an opening communicated with the second installation hole, and the heat exchanger is inserted into the installation housing through the second installation hole and the opening.

In some embodiments, the fresh air heat recovery assembly further includes a guide structure for guiding the heat exchanger, and the guide structure includes a chute provided in the installation housing and a slider provided on an outer wall of the heat exchanger and cooperated with the chute; or, the guide structure includes a slider provided in the installation housing and a chute provided on an outer wall of the heat exchanger and cooperated with the slider.

In some embodiments, the fresh air heat recovery assembly further includes an anti-detachment member for preventing the heat exchanger from detaching out of the first case.

In some embodiments, the anti-detachment member includes a pivot shaft connected with an outer wall surface of the first case and a blocking piece pivotally connected with the pivot shaft, and the blocking piece has a locking position abutting against the outer wall of the heat exchanger and an unlocking position separated from the heat exchanger.

In some embodiments, the air valve assembly includes: a second case; a baffle assembly, located in the second case, the baffle assembly including a rotating shaft and a baffle connected with the rotating shaft; and an air valve actuator, disposed in the second case, the air valve actuator being drivingly connected with the baffle.

According to another aspect of some embodiments of the present disclosure, an air conditioning system is provided. The air conditioning system includes: a housing, provided with an indoor air supply port; a heat recovery device, arranged in the housing, the heat recovery device being the above heat recovery device; a first heat exchanger, located in the housing; an air supply fan, located in the housing and arranged between the first heat exchanger and the heat recovery device, air discharged from the heat recovery device passing through the air supply fan and the first heat exchanger in sequence and then transported indoors through the indoor air supply port.

In some embodiments, the air conditioning system further includes a second heat exchanger and a compressor located in the housing, and the housing has a second outdoor air inlet and an outdoor air outlet.

By applying the technical solution of some embodiments in the present disclosure, since the shell, the fresh air heat recovery assembly and the air valve assembly form a modular overall structure, when the heat recovery device is applied to the field of air conditioning, the above heat recovery device is directly embedded in the housing of an air conditioner, labor and installation costs are effectively saved, and assembly efficiency is improved. In addition, specifically, outdoor fresh air enters the second heat exchange passage in the fresh air heat recovery assembly through the first outdoor air inlet, and indoor return air enters the air valve assembly through the indoor air return port. When the air conditioner is in a heating mode (heat pump operation mode), part of the indoor return air flows out through the first air supply port, and the other part of the indoor return air enters the first heat exchange passage of the fresh air heat recovery assembly. Thus, the outdoor fresh air having a lower temperature in the second heat exchange passage exchanges heat with the indoor return air having a higher temperature in the first heat exchange passage, so that the temperature of the outdoor fresh air in the second heat exchange passage increases, and when the air conditioning system supplies fresh air, a heat recovery function for the indoor return air is achieved, thereby reducing the energy consumption of the air conditioning system and meeting the energy-saving requirements of air conditioning equipment. When the air conditioner is in a cooling mode, part of the indoor return air flows out through the first air supply port, and the other part of the indoor return air enters the first heat exchange passage of the fresh air heat recovery assembly. Thus, the outdoor fresh air having a higher temperature in the second heat exchange passage exchanges heat with the indoor return air having a lower temperature in the first heat exchange passage, so that the temperature of the outdoor fresh air in the second heat exchange passage decreases, and when the air conditioning system supplies fresh air, a heat recovery function for the indoor return air is achieved, thereby reducing the energy consumption of the air conditioning system and meeting the energy-saving requirements of air conditioning equipment.

BRIEF DESCRIPTION OF THE DRAWINGS

The accompanying drawings, which constitute a part of this application, are used to provide a further understanding of the present disclosure, and the exemplary embodiments of the present disclosure and the description thereof are used to explain the present disclosure, but do not constitute improper limitations to the present disclosure. In the drawings.

The above drawings include the following reference numerals:

10, heat recovery device; 11, housing; 111, indoor air return port; 112, first outdoor air inlet; 114, air outlet; 12, air valve assembly; 121, second case; 1211, second support frame; 1212, second bottom plate; 1214, side baffle; 1215, middle spacer; 122, baffle assembly; 1221, rotating shaft; 1222, baffle; 123, air valve actuator; 126, first air supply port; 13, fresh air heat recovery assembly; 131, first case; 1311, top plate; 1312, bottom plate; 1313, first side plate; 1314, second side plate; 1315, installation plate; 1316, second installation hole; 1317, installation housing; 1318, guide structure; 1319, chute; 1320, slider; 132, fresh air fan; 133, heat exchanger; 134, fan governor; 135, anti-detachment member; 1351, pivot shaft; 1352, blocking piece; 136, first heat exchange passage; 137, second heat exchange passage; 138, second air supply port; 20, housing; 21, indoor air supply port; 22, second outdoor air inlet; 23, outdoor air outlet; 30, first heat exchanger; 40, air supply fan; 50, second heat exchanger; 60, compressor; 70, reversing valve.

DETAILED DESCRIPTION OF THE EMBODIMENTS

It is to be noted that in the case of no conflict, the features in the embodiments and the embodiments in the application may be combined with each other. The present disclosure is described below with reference to the drawings and in conjunction with the embodiments in detail.

It is to be noted that unless otherwise specified, all technical and scientific terms used in this application have the same meaning as commonly understood by a person of ordinary skill in the technical field to which this application belongs.

In the present disclosure, the orientation words such as "up, down, top, and bottom" are usually used for the directions shown in the drawings, or for the assemblies themselves in a vertical, perpendicular or gravity direction; likewise, for the convenience of understanding and description, "inside and outside" means inside and outside with respect to the outline of each assembly itself, but the above orientation words are not used to limit the present disclosure.

A heat recovery device 10 in some embodiments of the present disclosure is an integrated functional module that integrates a fresh air heat recovery assembly 13 and an air valve assembly 12. The integrated functional module is installed in the air conditioning system of some embodiments of the present disclosure. The air conditioning system is enabled to have the function of supplying fresh air and the function of heat recovery of indoor return air. The heat recovery device 10 is used by being inserted into a slot inside the air conditioner, and is replaced by being pulled out from the slot, which facilitates installation and disassembly and saves installation costs. Of course, the heat recovery device 10 in some embodiments of the present disclosure is not limited to being applied to an air conditioning system, and may also be applied to other systems.

Figure 2:
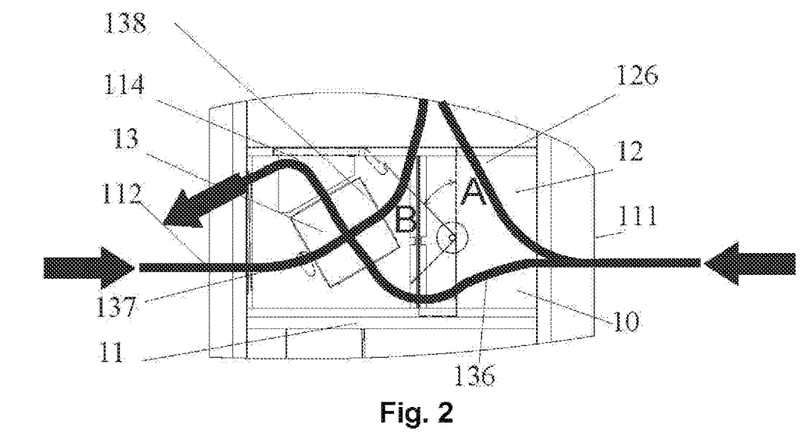
FIG. 2 illustrates a schematic structural diagram of a heat recovery device of the air conditioning system in FIG. 1.
Figure 3:
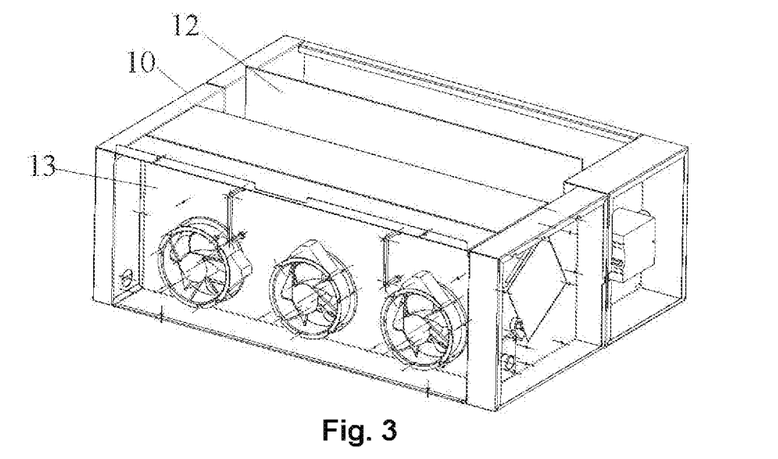
FIG. 3 illustrates a schematic stereostructure diagram of a heat recovery device of the air conditioning system in FIG. 1.

In some embodiments of the present disclosure, as shown in FIG. 2, a dotted line represents a baffle 1222 of the air valve assembly 12 at a first position (that is, position A), and a solid line represents the baffle 1222 of the air valve assembly 12 at a second position (that is, position B).

Figure 1:
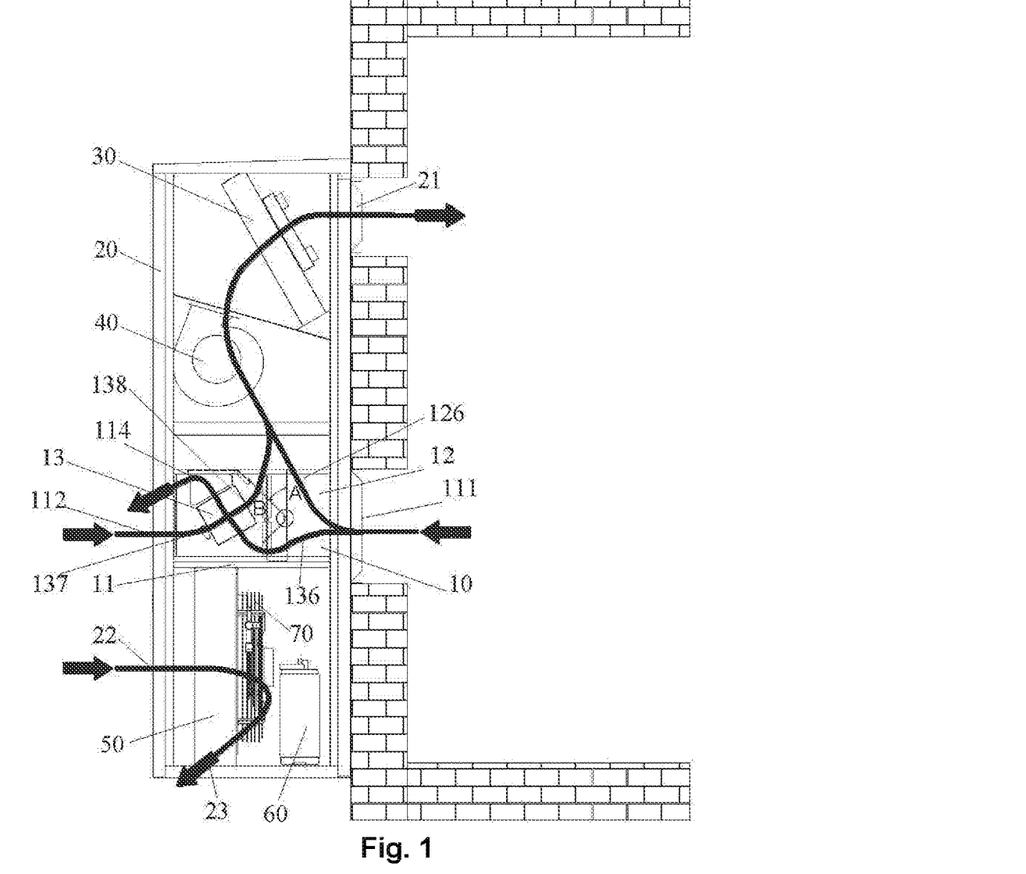
FIG. 1 illustrates a schematic stereostructure diagram of an embodiment of an air conditioning system according to an embodiment of the present disclosure.

As shown in FIG. 1, some embodiments of the present disclosure provide a heat recovery device 10. The heat recovery device 10 includes a shell 11, a fresh air heat recovery assembly 13 and an air valve assembly 12. The shell 11 is provided with an indoor return air port 111, a first outdoor air inlet 112 and an air outlet 114. The fresh air heat recovery assembly 13 is arranged in the shell 11. The fresh air heat recovery assembly 13 includes a first heat exchange passage 136 and a second heat exchange passage 137 exchanging heat with each other. The air valve assembly 12 is disposed in the shell 11, and located between the fresh air heat recovery assembly 13 and the indoor air return port 111. The air valve assembly 12 has a first position and a second position, wherein when the air valve assembly 12 is at the first position, the indoor air return port 111 is communicated with the air outlet 114 through the first heat exchange passage 136, the indoor air return port 111 is communicated with a first air supply port 126 of the air valve assembly 12, and the first outdoor air inlet 112 is communicated with a second air supply port 138 of the fresh air heat recovery assembly 13 through the second heat exchange passage 137; and when the air valve assembly 12 is at the second position, the air valve assembly 12 is blocked between the first outdoor air inlet 112 and the second air supply port 138 of the fresh air heat recovery assembly 13, and the indoor air return port 111 is communicated with the first air supply port 126.

According to the above arrangement, since the shell 11, the fresh air heat recovery assembly 13 and the air valve assembly 12 form a modular overall structure, when the heat recovery device is applied to a field of air conditioning, the above heat recovery device is directly embedded in the housing of an air conditioner, labor and installation costs are effectively saved, and assembly efficiency is improved. In addition, specifically, outdoor fresh air enters the second heat exchange passage 137 in the fresh air heat recovery assembly 13 through the first outdoor air inlet 112, and indoor return air enters the air valve assembly 12 through the indoor air return port 111. When the air conditioner is in a heating mode (heat pump operation mode), part of the indoor return air flows out through the first air supply port 126, and the other part of the indoor return air enters the first heat exchange passage 136 of the fresh air heat recovery assembly 13. Thus, the outdoor fresh air having a lower temperature in the second heat exchange passage 137 exchanges heat with the indoor return air having a higher temperature in the first heat exchange passage 136, so that the temperature of the outdoor fresh air in the second heat exchange passage 137 increases, and when the air conditioning system supplies fresh air, a heat recovery function for the indoor return air is achieved, thereby reducing the energy consumption of the air conditioning system and meeting the energy-saving requirements of air conditioning equipment. When the air conditioner is in a cooling mode, part of the indoor return air flows out through the first air supply port 126, and the other part of the indoor return air enters the first heat exchange passage 136 of the fresh air heat recovery assembly 13. Thus, the outdoor fresh air having a higher temperature in the second heat exchange passage 137 exchanges heat with the indoor return air having a lower temperature in the first heat exchange passage 136, so that the temperature of the outdoor fresh air in the second heat exchange passage 137 decreases, and when the air conditioning system supplies fresh air, a heat recovery function for the indoor return air is achieved, thereby reducing the energy consumption of the air conditioning system and meeting the energy-saving requirements of air conditioning equipment. In addition, the heat recovery device 10 is a functional module that integrates the fresh air heat recovery assembly 13 and the air valve assembly 12, which is convenient for installation and disassembly, and saves installation costs.

Figure 5:
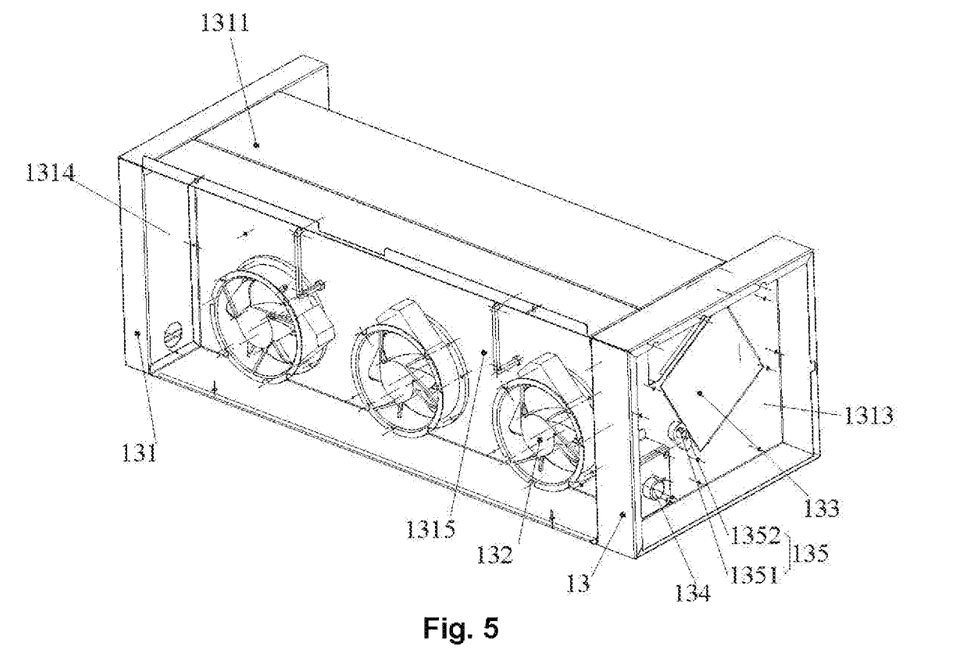
FIG. 5 illustrates a schematic stereostructure diagram of a fresh air heat recovery assembly of a heat recovery device of the air conditioning system in FIG. 1.
Figure 6:
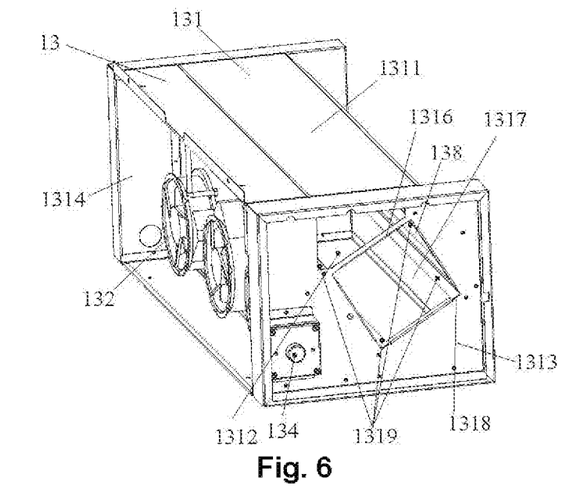
FIG. 6 illustrates a schematic structural composition diagram of the fresh air heat recovery assembly in FIG. 5 (a heat exchanger is not installed herein)
Figure 7:
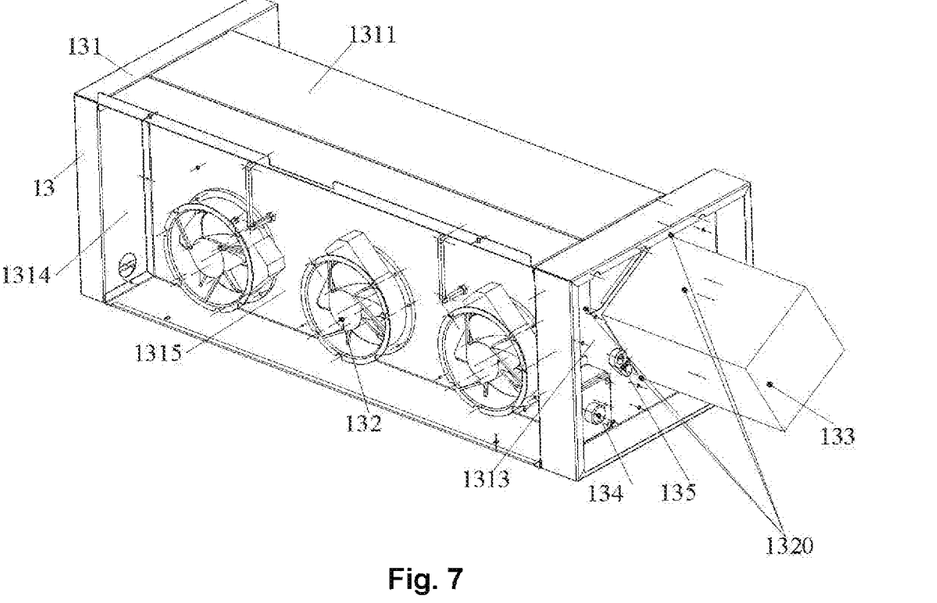
FIG. 7 illustrates a schematic structural composition diagram of the fresh air heat recovery assembly in FIG. 5 (a heat exchanger is shown herein)

As shown in FIG. 5 to FIG. 7, in some embodiments of the present disclosure, the fresh air heat recovery assembly 13 further includes a first case 131, a fresh air fan 132 and a heat exchanger 133. The fresh air fan 132 is disposed in the first case 131, the fresh air fan 132 is disposed correspondingly to the first outdoor air inlet 112, and the fresh air fan 132 is configured to transport fresh air from outside into the second heat exchange passage 137; and the heat exchanger 133 is disposed in the first case 131, and the first heat exchange passage 136 and the second heat exchange passage 137 are disposed inside the heat exchanger 133.

According to the above arrangement, the heat exchanger 133 uses the first heat exchange passage 136 and the second heat exchange passage 137 therein to achieve a heat recovery function for indoor return air. In addition, the air supply fan 40 sucks indoor return air and outdoor fresh air sucked from the fresh air fan 132, thereby realizing the function of supplying outdoor fresh air. The first case 131 provides an installation space for the fresh air fan 132 and the heat exchanger 133. In this way, the first case 131, the fresh air fan 132 and the heat exchanger 133 form a modular overall structure which directly inserts the fresh air heat recovery assembly 13 in the shell 11, thereby effectively improving the installation efficiency, and saving the installation cost.

It is to be noted that the fresh air heat recovery assembly 13 is provided with two heat exchange tubes that are not communicated with each other. The heat exchange tubes form a first heat exchange passage 136 and a second heat exchange passage 137 in the fresh air heat recovery assembly 13.

As shown in FIG. 5 to FIG. 7, in some embodiments of the present disclosure, the fresh air heat recovery assembly 13 further includes a fan governor 134 for adjusting a rotation speed of the fresh air fan 132, and the fan governor 134 is disposed in the first case 131.

In the above arrangement, the fan governor 134 mainly adjusts a suction volume of outdoor fresh air into the fresh air fan 132 by adjusting the rotation speed of the fresh air fan 132. In this way, the rotation speed of the fresh air fan 132 is adjusted according to the actual situation, thereby adjusting an intake amount of fresh air. It is to be noted that the fan governor 134 is configured to adjust the rotation speed of the fresh air fan 132, and the magnitude of the rotation speed will affect the intake amount of fresh air.

In some embodiments, as shown in FIG. 5 to FIG. 7, the first case 131 includes a top plate 1311 and a bottom plate 1312 arranged oppositely, and a first side plate 1313 and a second side plate 1314 for connecting the top plate 1311 and the bottom plate 1312, the first side plate 1313 and the second side plate 1314 are arranged oppositely. In the above arrangement, the first case 131 is simple in structure and convenient to assemble.

In some embodiments, as shown in FIG. 5 to FIG. 7, the fresh air heat recovery assembly 13 further includes an installation plate 1315 disposed in the first case 131, the installation plate 1315 is provided with a first installation hole for installing the fresh air fan 132, and the installation plate 1315 is connected to the bottom plate 1312.

In the above arrangement, the first case 131 is formed by connecting different plate bodies, which facilitates the installation of other assemblies of the fresh air heat recovery assembly 13. The above plate bodies can all adopt standard steel plates, convenient for processing and saves costs.

Of course, in alternative embodiments not shown in the drawings of the present disclosure, the installation plate 1315 is connected with both the bottom plate 1312 and the top plate 1311.

As shown in FIG. 6, in some embodiments of the present disclosure, the first side plate 1313 is provided with a second installation hole 1316, and the fresh air heat recovery assembly 13 further includes an installation housing 1317 located in the first case 131. The installation housing 1317 is provided with an opening communicated with the second installation hole 1316. The heat exchanger 133 is inserted into the installation housing 1317 through the second installation hole 1316 and the opening.

Of course, in alternative embodiments not shown in the drawings of the present disclosure, the second installation hole 1316 is provided on the second side plate 1314 according to an actual situation.

The above second air supply port 138 is provided on a side wall of the installation housing 1317, and the number of the second air supply port 138 may be one or plural. When the air valve assembly 12 is at the first position, the first outdoor air inlet 112 is communicated with the second air inlet 138 of the fresh air heat recovery assembly 13 through the second heat exchange passage 137 to ensure that the outdoor fresh air enters the air supply fan 40 smoothly.

As shown in FIG. 6 and FIG. 7, in some embodiments of the present disclosure, the fresh air heat recovery assembly 13 further includes a guide structure 1318 for guiding the heat exchanger 133, and the guide structure 1318 includes a chute 1319 provided in the installation housing 1317 and a slider 1320 provided on an outer wall of the heat exchanger 133 and cooperated with the chute 1319.

In the above arrangement, a sliding fit of the chute 1319 and the slider 1320 enables the heat exchanger 133 to be smoothly pulled out or inserted into the installation housing 1317, which facilitates the installation and replacement of the heat exchanger 133, thereby improving the maintenance and disassembly efficiency of the fresh air heat recovery assembly 13.

Of course, in alternative embodiments not shown in the drawings of the present disclosure, the guide structure 1318 further includes a slider 1320 provided in the installation housing 1317 and a chute 1319 provided on an outer wall of the heat exchanger 133 and cooperated with the slider 1320.

As shown in FIG. 5 and FIG. 7, in some embodiments of the present disclosure, the fresh air heat recovery assembly 13 further includes an anti-detachment member 135 for preventing the heat exchanger 133 from detaching out of the first case 131. In the above arrangement, the anti-detachment member 135 locks the heat exchanger 133 at a working position, thereby ensuring that the fresh air heat recovery assembly 13 works normally.

In some embodiments, as shown in FIG. 5 and FIG. 7, the anti-detachment member 135 includes a pivot shaft 1351 connected with an outer wall surface of the first case 131 and a blocking piece 1352 pivotally connected with the pivot shaft 1351. The blocking piece 1352 has a locking position abutting against the outer wall of the heat exchanger 133 and an unlocking position separated from the heat exchanger 133.

In the above arrangement, when the heat exchanger 133 is in a locked state, the blocking piece 1352 abuts against the outer wall of the heat exchanger 133, thereby locking the heat exchanger 133 to the installation housing 1317, thereby ensuring that the fresh air heat recovery assembly 13 works normally. By rotating the blocking piece 1352, the blocking piece 1352 is not in contact with the outer wall of the heat exchanger 133, so that the heat exchanger 133 is taken out from the installation housing 1317 for easy replacement or installation.

Figure 4:
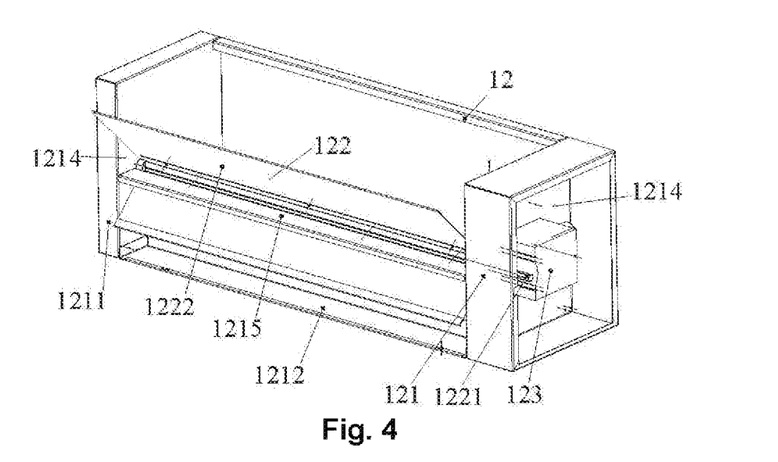
FIG. 4 illustrates a schematic stereostructure diagram of an air valve assembly of a heat recovery device of the air conditioning system in FIG. 1.

As shown in FIG. 4, in some embodiments of the present disclosure, the air valve assembly 12 includes a second case 121, a baffle assembly 122 and an air valve actuator 123. The baffle assembly 122 is located in the second case 121, the baffle assembly 122 includes a rotating shaft 1221 and a baffle 1222 connected with the rotating shaft 1221, the air valve actuator 123 is disposed in the second case 121, and the air valve actuator 123 is drivingly connected with the baffle 1222.

According to the above arrangement, the second case 121 provides an installation space for the baffle assembly 122 and the air valve actuator 123. The air valve actuator 123 is configured to drive the rotating shaft 1221 of the baffle assembly 122 to rotate, thereby driving the baffle 1222 to rotate, enabling the air valve assembly 12 to control the amount of fresh air, or achieving the function of turning on or off the intake of fresh air.

As shown in FIG. 4, in some embodiments of the present disclosure, the second case 121 includes a second support frame 1211, a second bottom plate 1212, a side baffle 1214, and a middle spacer 1215. The second bottom plate 1212 is disposed at a bottom of the second support frame 1211. There are two side baffles 1214, which are respectively disposed at the left and right ends of the second support frame 1211 oppositely. The middle spacer 1215 is disposed in a middle of the second support frame 1211. Wherein, the air valve actuator 123 is disposed on one of the two side baffles 1214, and the air valve actuator 123 is connected with the rotating shaft 1221.

As shown in FIG. 1, in some embodiments of the present disclosure, when the baffle 1222 is rotated to the position A, the air valve assembly 12 is at the first position, and when the baffle 1222 is rotated to the position B, the air valve assembly 12 is at the second position. It is to be noted that when the air valve assembly 12 is at the second position, the air valve assembly 12 prevents outdoor fresh air from entering indoors.

In the above arrangement, the air valve assembly 12 adjusts a relative position of the baffle 1222 in the baffle assembly 122 and the second case 121, so that the air valve assembly 12 is at the first position and cooperates with the fresh air heat recovery assembly 13 to achieve the functions of suction of outdoor fresh air and heat recovery of indoor return air.

As shown in FIG. 1, some embodiments of the present disclosure also provide an air conditioning system. The air conditioning system includes a housing 20, a heat recovery device and a first heat exchanger 30. The housing 20 is provided with an indoor air supply port 21. The heat recovery device is disposed in the housing 20, and the heat recovery device is the above heat recovery device 10. The first heat exchanger 30 is located in the housing 20. The air supply fan 40 is located in the housing 20 and disposed between the first heat exchanger 30 and the heat recovery device 10. Air discharged from the heat recovery device 10 passes through the air supply fan 40 and the first heat exchanger 30 in sequence and then is transported indoors through the indoor air supply port 21.

As shown in FIG. 1, in some embodiments of the present disclosure, the air conditioning system further includes a second heat exchanger 50 and a compressor 60 located in the housing 20, and the housing 20 includes a second outdoor air inlet 22 and an outdoor air outlet 23.

Specifically, the compressor 60 is connected with the second heat exchanger 50. The reversing valve 70 is connected with the second heat exchanger 50, the first heat exchanger 30 and the compressor 60, respectively.

Figure 8:
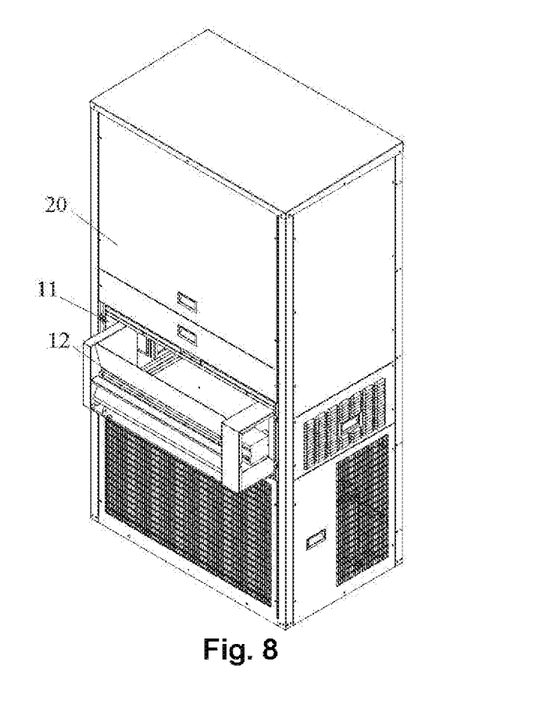
FIG. 8 illustrates a schematic stereostructure diagram of the air valve assembly in FIG. 4 cooperated with a housing (the air valve assembly has not been completely installed in the housing herein)
Figure 9:
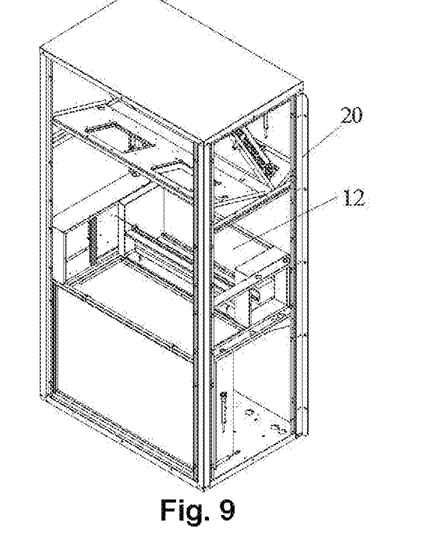
FIG. 9 illustrates a schematic stereostructure diagram of the air valve assembly in FIG. 4 completely assembled with a housing (an installation plate on the housing is not shown herein)

As shown in FIG. 8 and FIG. 9, in some embodiments of the present disclosure, the air valve assembly 12 is disposed in the housing 20 in a detachable manner. When the air valve assembly 12 needs to be installed, the air valve assembly 12 is pushed into the housing 20 from one side of the housing 20 until it cannot be pushed, and the air valve assembly 12 is fixed into the housing 20 by bolts.

Figure 10:
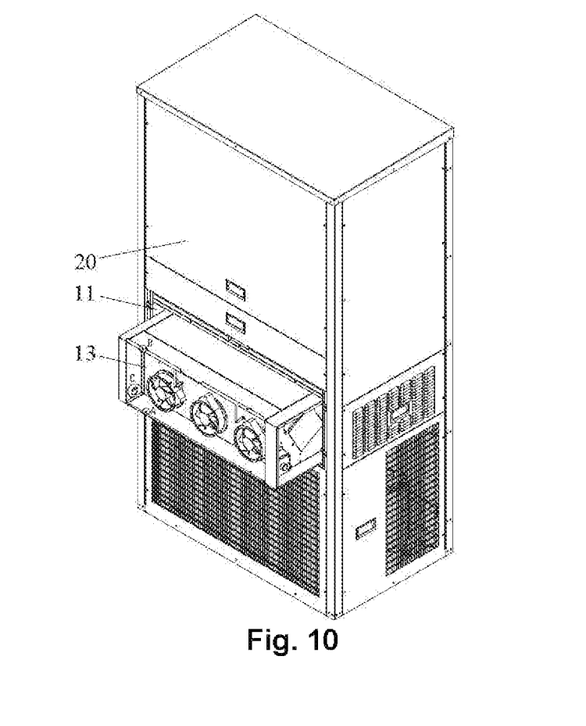
FIG. 10 illustrates a schematic stereostructure diagram of the fresh air heat recovery assembly in FIG. 5 cooperated with a housing (the fresh air heat recovery assembly is not completely installed in the housing herein)
Figure 11:
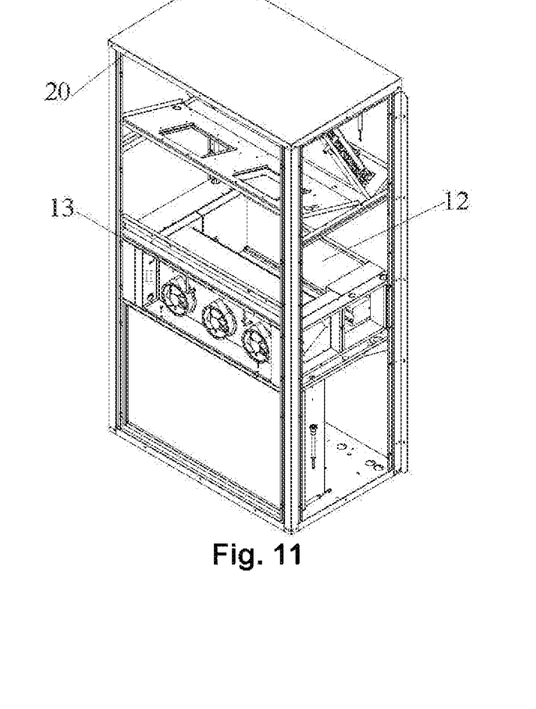
FIG. 11 illustrates a schematic stereostructure diagram of the fresh air heat recovery assembly in FIG. 5 completely assembled with a housing (an installation plate on the housing is not shown herein).

As shown in FIG. 10 and FIG. 11, in some embodiments of the present disclosure, after the air valve assembly 12 is completely installed, the fresh air heat recovery assembly 13 is pushed into the housing 20 from one side of the housing 20 until it cannot be pushed, and the fresh air heat recovery assembly 13 is fixed into the housing 20 by bolts.

From the above description, it can be seen that the above embodiment of the present disclosure achieves the following technical effects: since the shell, the fresh air heat recovery assembly and the air valve assembly form a modular overall structure, when the heat recovery device is applied to the field of air conditioning, the above heat recovery device is directly embedded in the housing of an air conditioner, labor and installation costs are effectively saved, and assembly efficiency is improved. In addition, specifically, outdoor fresh air enters the second heat exchange passage in the fresh air heat recovery assembly through the first outdoor air inlet, and indoor return air enters the air valve assembly through the indoor air return port. When the air conditioner is in a heating mode (heat pump operation mode), part of the indoor return air flows out through the first air supply port, and the other part of the indoor return air enters the first heat exchange passage of the fresh air heat recovery assembly. Thus, the outdoor fresh air having a lower temperature in the second heat exchange passage exchanges heat with the indoor return air having a higher temperature in the first heat exchange passage, so that the temperature of the outdoor fresh air in the second heat exchange passage increases, and when the air conditioning system supplies fresh air, a heat recovery function for the indoor return air is achieved, thereby reducing the energy consumption of the air conditioning system and meeting the energy-saving requirements of air conditioning equipment. When the air conditioner is in a cooling mode, part of the indoor return air flows out through the first air supply port, and the other part of the indoor return air enters the first heat exchange passage of the fresh air heat recovery assembly. Thus, the outdoor fresh air having a higher temperature in the second heat exchange passage exchanges heat with the indoor return air having a lower temperature in the first heat exchange passage, so that the temperature of the outdoor fresh air in the second heat exchange passage decreases, and when the air conditioning system supplies fresh air, a heat recovery function for the indoor return air is achieved, thereby reducing the energy consumption of the air conditioning system and meeting the energy-saving requirements of air conditioning equipment. In addition, the heat recovery device is a functional module that integrates the fresh air heat recovery assembly and the air valve assembly, which is convenient for installation and disassembly, and saves installation costs.

It is apparent that the described embodiments are only a part of the embodiments of the present disclosure, not all of the embodiments. On the basis of the embodiments of the present disclosure, all other embodiments obtained on the premise of no creative work of those of ordinary skill in the art should fall within the scope of protection of the present disclosure.

It is to be noted that terms used herein only aim to describe specific implementation manners, and are not intended to limit exemplar implementations of this application. Unless otherwise directed by the context, singular forms of terms used herein are intended to include plural forms. Besides, it will be also appreciated that when terms "contain" and/or "include" are used in the description, it is indicated that features, steps, operations, devices, assemblies and/or a combination thereof exist.

It is to be noted that the specification and claims of the application and the terms "first", "second" and the like in the drawings are used to distinguish similar objects, and do not need to describe a specific sequence or a precedence order. It will be appreciated that data used in such a way may be exchanged under appropriate conditions, in order that the implementation manners of the application described here can be implemented in a sequence other than sequences graphically shown or described here.

The above is only some embodiments of the present disclosure, not intended to limit the present disclosure. As will occur to those skilled in the art, the present disclosure is susceptible to various modifications and changes. Any modifications, equivalent replacements, improvements and the like made within the spirit and principle of the present disclosure shall fall within the scope of protection of the present disclosure.

What is claimed is:

1. A heat recovery device, comprising:
   a shell, the shell being provided with an indoor air return port, a first outdoor air inlet and an air outlet;
   a fresh air heat recovery assembly, disposed in the shell, the fresh air heat recovery assembly comprising a first heat exchange passage and a second heat exchange passage exchanging heat with each other; and an air valve assembly, disposed in the shell, and located between the fresh air heat recovery assembly and the indoor air return port, wherein the air valve assembly has a first position and a second position; when the air valve assembly is at the first position, the indoor air return port is communicated with the air outlet through the first heat exchange passage, the indoor air return port is communicated with a first air supply port of the air valve assembly, and the first outdoor air inlet is communicated with a second air supply port of the fresh air heat recovery assembly through the second heat exchange passage; and when the air valve assembly is at the second position, the air valve assembly is blocked between the first outdoor air inlet and the second air supply port of the fresh air heat recovery assembly, and the indoor air return port is communicated with the first air supply port; the shell, the fresh air heat recovery assembly and the air valve assembly form a modular overall structure, enabling the heat recovery device to be an integrated functional module that integrates the fresh air heat recovery assembly and the air valve assembly;

the fresh air heat recovery assembly further comprises:

a first case;

a fresh air fan, disposed in the first case, the fresh air fan being arranged correspondingly to the first outdoor air inlet, and the fresh air fan being configured to transport fresh air from outside into the second heat exchange passage; and a heat exchanger, disposed in the first case, the first heat exchange passage and the second heat exchange passage being disposed inside the heat exchanger;

wherein the air valve assembly comprises:

a second case;

a baffle assembly, located in the second case, the baffle assembly comprising a rotating shaft and a baffle connected with the rotating shaft; and an air valve actuator, disposed in the second case, the air valve actuator being drivingly connected with the baffle so that the baffle is rotatably arranged;

the fresh air heat recovery assembly further comprises an anti-detachment member for preventing the heat exchanger from detaching out of the first case;

wherein the anti-detachment member comprises a pivot shaft connected with an outer wall surface of the first case and a blocking piece pivotally connected with the pivot shaft, the blocking piece having a locking position abutting against the outer wall of the heat exchanger and an unlocking position separated from the heat exchanger.

2. The heat recovery device according to claim 1, wherein the fresh air heat recovery assembly further comprises a fan governor for adjusting a rotation speed of the fresh air fan, the fan governor being disposed in the first case.

3. The heat recovery device according to claim 1, wherein the first case comprises a top plate and a bottom plate disposed oppositely, and a first side plate and a second side plate for connecting the top plate and the bottom plate, the first side plate and the second side plate being arranged oppositely.

4. The heat recovery device according to claim 3, wherein the fresh air heat recovery assembly further comprises an installation plate disposed in the first case, the installation plate is provided with a first installation hole for installing the fresh air fan, and the installation plate is connected with the bottom plate; or, the installation plate is connected with both the bottom plate and the top plate.

5. The heat recovery device according to claim 3, wherein the first side plate or the second side plate is provided with a second installation hole, the fresh air heat recovery assembly further comprises an installation housing located in the first case, the installation housing is provided with an opening communicated with the second installation hole, and the heat exchanger is inserted into the installation housing through the second installation hole and the opening.

6. The heat recovery device according to claim 5, wherein the fresh air heat recovery assembly further comprises a guide structure for guiding the heat exchanger, and the guide structure comprises a chute provided in the installation housing and a slider provided on an outer wall of the heat exchanger and cooperated with the chute; or, the guide structure comprises a slider provided in the installation housing and a chute provided on an outer wall of the heat exchanger and cooperated with the slider.

7. An air conditioning system, comprising:

a housing, the housing being provided with an indoor air supply port;

the heat recovery device according to claim 1, wherein the heat recovery device is disposed in the housing;

a first heat exchanger, located in the housing;

an air supply fan, located in the housing and disposed between the first heat exchanger and the heat recovery device, air discharged from the heat recovery device passing through the air supply fan and the first heat exchanger in sequence and then transported indoors through the indoor air supply port.

8. The air conditioning system according to claim 7, further comprising a second heat exchanger and a compressor located in the housing, the housing having a second outdoor air inlet and an outdoor air outlet.

* * * * *